United States Patent [19]

Kuboniwa

[11] Patent Number: 5,485,413
[45] Date of Patent: Jan. 16, 1996

[54] MULTIPLIER UTILIZING THE BOOTH ALGORITHM

[75] Inventor: Osamu Kuboniwa, Tokyo, Japan

[73] Assignee: NEC Corporation, Tokyo, Japan

[21] Appl. No.: 311,185

[22] Filed: Sep. 23, 1994

[30] Foreign Application Priority Data

Sep. 24, 1993 [JP] Japan ................................ 5-258937

[51] Int. Cl.$^6$ ...................................................... G06F 7/52
[52] U.S. Cl. ............................................................ 364/760
[58] Field of Search .............................. 364/754, 757–760

[56] References Cited

U.S. PATENT DOCUMENTS 5,268,858 12/1993 Briggs ...................................... 364/760

OTHER PUBLICATIONS

"Digital Signal Processing", Electronic Communications Society, pp. 144–147, May 30, 1987.

Primary Examiner—Tan V. Mai
Attorney, Agent, or Firm—Foley & Lardner

[57] ABSTRACT

Coefficients each corresponding to the radical numbers of 2 are generated by a coefficient generator based on the secondary Booth algorithm. Based on the coefficients, partial products of a multiplicand are calculated by a partial product generator and converted into positive numbers by adders. A corrective bit of "1" is added by an adder to the least significant bit of those bits to which "1" has been added by the conversion of partial products into positive numbers, and the sum of partial products corresponding to the radical numbers of 2, i.e., a multiplication result, is determined by adders.

2 Claims, 3 Drawing Sheets

MULTIPLIER UTILIZING THE BOOTH ALGORITHM

BACKGROUND OF THE INVENTION

1. Field of the Invention

The present invention relates to a multiplier, and more particularly to a multiplier utilizing the Booth algorithm.

2. Description of the Prior Art

There has been known a high-speed multiplier which utilizes the Booth algorithm that is used as an arithmetic process for digital filters. See, for example, *Digital Signal Processing*, p. 145, published by the Electronic Communications Society.

A multiplication process based on the Booth algorithm will be described below.

It is assumed that a multiplicand is represented by X, a multiplier by Y, and the product of the multiplicand X and the multiplier Y by U. First, the multiplier Y is expressed by a series of multiplier codes represented by complements of 2 according to equation (1a), and the series of multiplier codes is replaced by a series of differential codes according to equation (1b).

$$Y = -y_0 \times 2^m + y_1 \times 2^{m-1} + y_2 \times 2^{m-2} + \ldots + y_{m-1} \times 2^1 + y_m \times 2^0 \quad (1a)$$

$$= (y_1 - y_0) \times 2^m + (y_2 - y_1) \times 2^{m-1} + \ldots + (y_{m+1} - y_m) \times 2^0. \quad (1b)$$

With $y_{m+1}=0$, equation (1b) can be rewritten as follows:

$$Y = \sum_{i=0}^{m} (y_{i+1} - y_i) \times 2^{m-i}. \quad (1c)$$

Therefore, the product is given by:

$$U = X \times Y \quad (2)$$
$$= \sum_{i=0}^{m} (y_{i+1} - y_i) \times X \times 2^{m-i}.$$

A multiplication can be realized by repeating addition and shifted addition of the multiplicand X with codes $y_i$, $y_{i+1}$ as follows:

| $y_i$ | $y_{i+1}$ | arithmetic operation |
|---|---|---|
| 0 | 0 | 0 |
| 0 | 1 | +X |
| 1 | 0 | −X |
| 1 | 1 | 0 |

When pairs of the terms of equation (2) are put together, equation (2) can be expressed by:

$$U = X \times Y \quad (3)$$
$$= \sum_{i=0}^{m/2} (y_{2i+2} + y_{2i+1} - 2 \times y_{2i}) \times X \times 2^{m-2i-1}.$$

Multiplication expressed by complements of 2 based on the secondary Booth algorithm can thus be realized by adding and subtracting multiplicands X, 2X with codes $y_{2i}$, $y_{2i+1}$, $y_{2i+2}$ as follows:

| $y_{2i}$ | $y_{2i+1}$ | $y_{2i+2}$ | arithmetic operation |
|---|---|---|---|
| 0 | 0 | 0 | 0 |
| 0 | 0 | 1 | +X |
| 0 | 1 | 0 | +X |
| 0 | 1 | 1 | +2X |
| 1 | 0 | 0 | −2X |
| 1 | 0 | 1 | −X |
| 1 | 1 | 0 | −X |
| 1 | 1 | 1 | 0 |

If the multiplicand X and the multiplier Y are M- and N-bit numbers, respectively, in binary notation, then when the product of the coefficient relating to the degree of each $2^{m-2i-1}$ and the multiplicand X, i.e., the partial product, is positive, the complement of 2 representation is M+1 bits at maximum, but when the product is negative, the complement of 2 representation extends to an (M+N−1)th bit.

For example, if the multiplicand X is 15 and the multiplier Y is 55, then the product U is given according to equation (3) by:

$$U = X \times Y$$
$$= 15 \times 55$$
$$= 15 \times \{(-1) \times 2^0 + 2 \times 2^2 + (-1) \times 2^4 + 1 \times 2^6\}$$
$$= -15 + 120 - 240 + 960$$
$$= 825.$$

When the above calculation is expressed by binary notation, the partial product relating to the degree of each $2^{m-2i-1}$ is represented by:

```
    1111111110001   −15
         01111000    120
    111100010000   −240
+)   01111000000    960
```

As the degree of $2^{m-2i-1}$ is lower, the bits of a negative number extend to the high-order bit side, resulting in a need for a number of adders.

To prevent the bits from being thus extended, "1" is added to each of the Mth and (M+1)th bits, i.e., two high-order bits, of the complement of 2 representation, thereby converting the negative number into a positive number as follows:

```
          010101    −15 + 96 = 81
       110001000    120 + 384 = 504
     10100010000    −240 + 1536 = 1296
+)  1101111000000   960 + 6144 = 7104
```

Therefore, since each partial product changes to a positive number, the bit is prevented from being extended to the high-order bit side, making it possible to reduce the number of adders required to calculate partial products.

In determining the sum of partial products which have been converted into positive numbers, inasmuch as "1" has been added to only the two high-order bits of each of the partial products for the conversion of the partial products into respective positive numbers, these sums are different from actual products. Therefore, it is necessary to correct for the conversion into positive numbers in the calculation of the sum.

The addition of "1" to the two high-order bits of each of the partial products for the conversion of the partial products into respective positive numbers results in the addition of "1" to all bits of the Mth and higher bits as counted from the low-order bit in the sum of converted partial products, i.e., the product. The "1" added to all bits of the sum can be removed to a carry by adding "1" to the other bits, i.e., all bits of the (M−1)th and lower bits., and finally adding "1" to the least significant position of the sum.

FIG. 1 of the accompanying drawings shows an arrangement for calculating a multiplication result with a conventional multiplier for determining the sum of partial products which have been converted into positive numbers. In FIG. 1, denoted at P00–P06, P10–P16, P20– P26, P30–P36 are partial products which have been converted into positive numbers, with P00, P10, P20, P30 representing respective least significant bits (LSBs) thereof and P06, P16, P26, P36 representing respective most significant bits (MSBs) thereof.

The multiplier includes adders 53 each for adding 1-bit inputs and outputting results S and carries C. Denoted at 54 is the sum of partial products, i.e., the product of a multiplier and a multiplicand, 52 is a carry which is produced from the sum 54 by a correction, and 50, 51 are corrective bits "1" to be added for a correction.

The partial products P00–P06, P10–P16, P20– P26, P30–P36 which have been converted into positive numbers are inputted to the adders 53 while they have been shifted two high-order bits corresponding to the degree of 2 based on the secondary Booth algorithm.

Since those bits to which "1" have been added by the conversion into positive numbers are P36, P35, P26, P25, P16, P15, P06, P05, as counted from the high-order bit, the corrective bit 50 of "1" is added to the other bits P04–P00, and their sum is determined.

If the partial products are negative before they are converted, then "1" is added as P0 negative, P1 negative, P2 negative, P3 negative to the respective least significant bits P00, P10, P20, P30 of the partial products which have been converted into positive numbers.

The corrective bit 51 of "1" is then added to the least significant bit of the sum thus determined to thereby correct for the conversion into positive numbers. If the carry 52 is produced, it is ignored. Since the carry 52 is ignored, the partial products become equivalent to those with nothing added thereto, and the product 54 of the multiplier and the multiplicand is outputted.

Because of the correction required for the conversion of the partial products into positive numbers, the conventional multiplier requires a number of adders which increase the circuit area needed for the multiplier in an entire LSI circuit and which also result in an increased power requirement and a lowered calculation speed.

SUMMARY OF THE INVENTION

It is an object of the present invention to provide a multiplier which has a small circuit scale, a low power requirement, and a high calculation speed.

According to the present invention, there is provided a multiplier comprising coefficient generating means for generating a plurality of coefficients each corresponding to the radical numbers of 2 from predetermined bits of a multiplier based on the Booth algorithm, partial product generating means for calculating a plurality of partial products indicative of products of the coefficients and a multiplicand of M bits (M is a positive integer), first adding means for adding "1" to each of Mth and (M+1)th bits as counted from a least significant bit of each of the partial products, second adding means for adding "1" to an Mth bit as counted from a least significant bit of a multiplication result, and third adding means for adding a sum from the first adding means and a sum from the second adding means depending on the degree of 2.

The above and other objects, features, and advantages of the present invention will become apparent from the following description by referring to the accompanying drawings which illustrate examples of the present invention.

DETAILED DESCRIPTION OF THE PREFERRED EMBODIMENT

Figure 1:
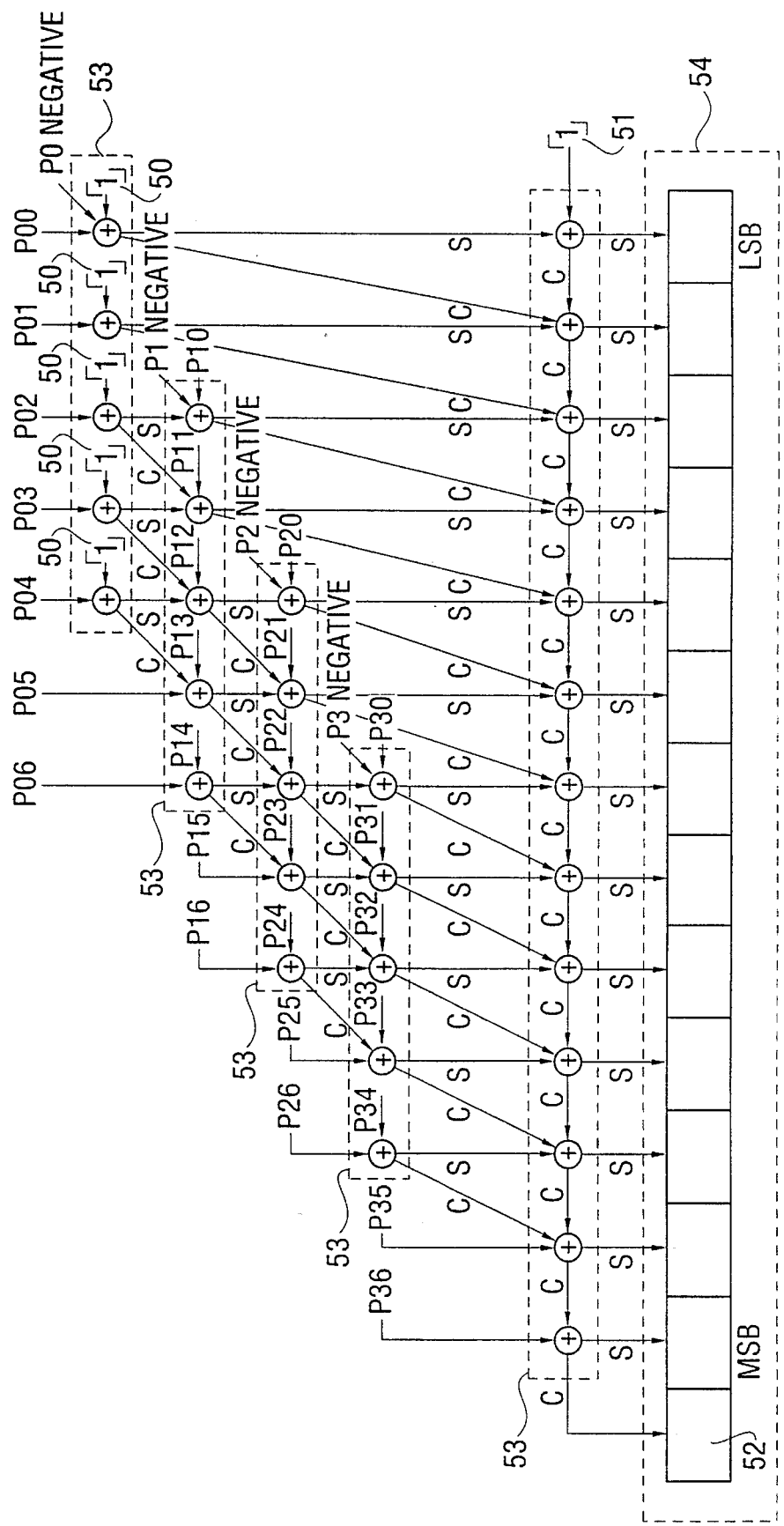
FIG. 1 is a block diagram of an arrangement of a conventional multiplier for calculating a multiplication result.
Figure 2:
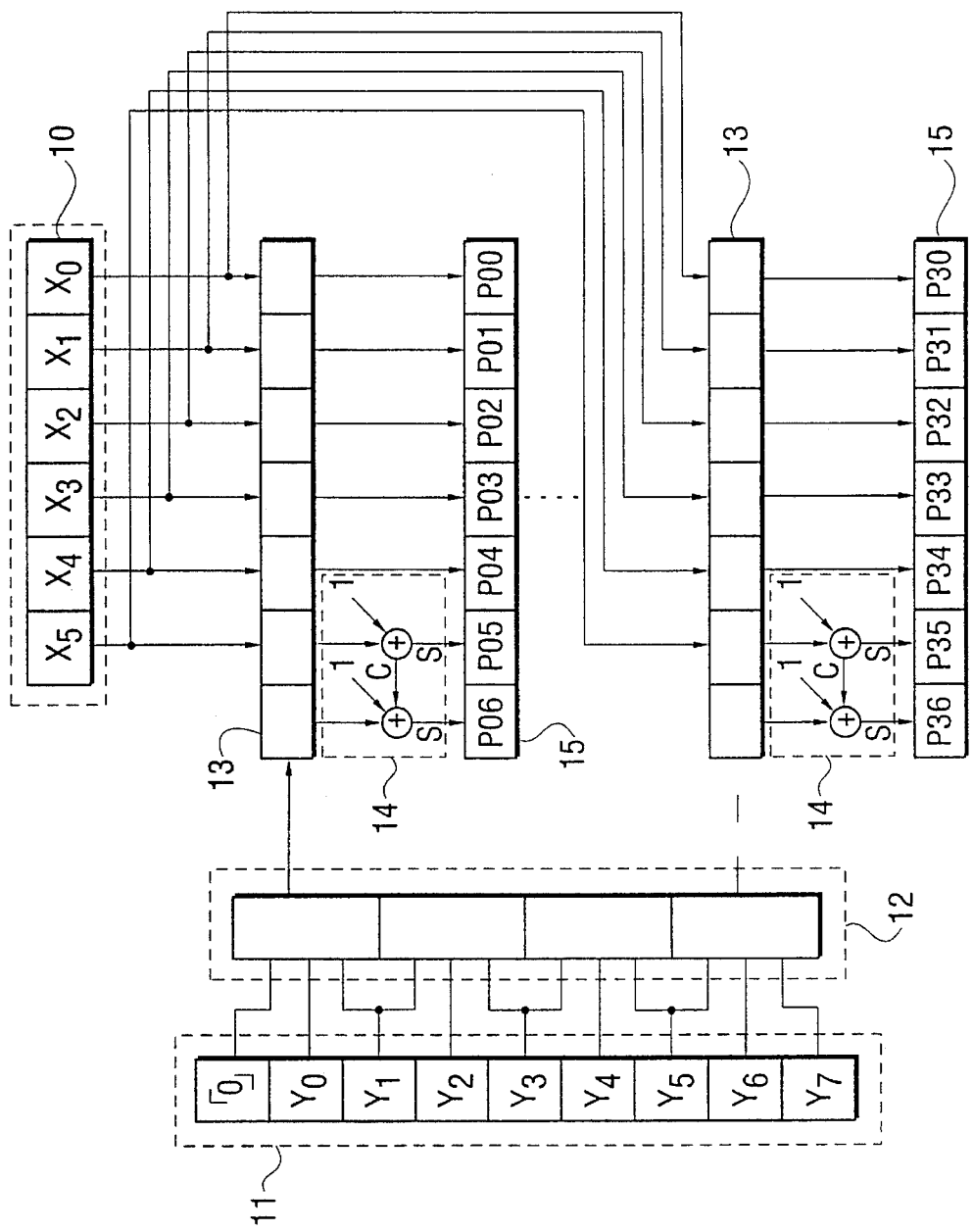
FIG. 2 is a block diagram of an arrangement of a multiplier according to the present invention for calculating partial results.
Figure 3:
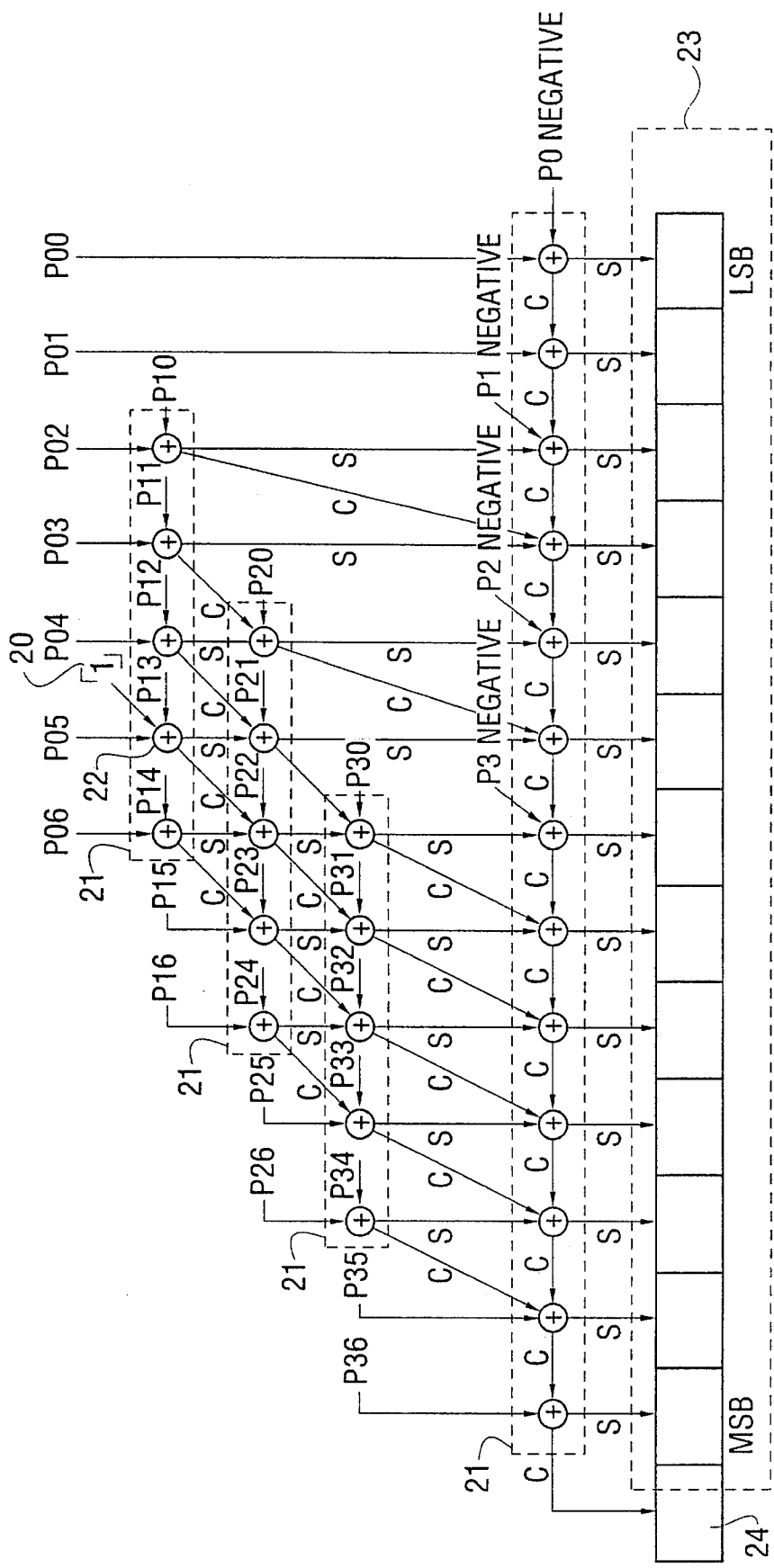
FIG. 3 is a block diagram of an arrangement of the multiplier according to the present invention for calculating a multiplication result.

FIGS. 2 and 3 show a multiplier according to the present invention which utilizes the secondary Booth algorithm for obtaining the product of a multiplicand X of 6 bits and a multiplier Y of 8 bits. FIG. 2 illustrates an arrangement of the multiplier for calculating partial products which have been converted into positive numbers, and FIG. 3 illustrates an arrangement of the multiplier for calculating a multiplication result.

As shown in FIG. 2, a coefficient generating circuit (coefficient generating means) 12 generates coefficients corresponding to the degree of 2 from a multiplier 11 represented by complements of two based on the secondary Booth algorithm. Partial product generators (partial product generating means) 13 calculate partial products represented by complements of 2 based on the coefficients outputted from the coefficient generating circuit 12. Adders (first adding means) 14 add "1" to high-order bits, i.e., 6th and 7th bits, of the partial products. The partial product generators 13 and the adders 14 generate partial products 15 (P00– P06, P10–P16, P20–P26, P30–P36) which have been corrected into positive numbers.

As shown in FIG. 3, an adder (second adding means) 22 adds a corrective bit 20 of "1" to the partial product P05. Adders (third adding means) 21 add the partial products 15 which have been converted into positive numbers depending on the degree of 2. The adders 21 output the sum of the partial products, i.e., a multiplication result 23 indicative of the product of the multiplier 11 and a multiplicand 10, and a carry 24 which is produced from the multiplication result 23 by correction for the conversion from the partial products 15 into positive numbers.

Operation of the multiplier will be described below with reference to FIGS. 2 and 3.

In FIG. 2, a plurality of coefficients each corresponding to the degree of 2 are generated from the multiplier 11 ($y_0$–$y_7$) in the complement of 2 representation by the coefficient generator 12 based on the secondary Booth algorithm. Based on the coefficients, the partial product generator 13 multiplies the multiplicand 10 ($x_0$–$x_5$) by 0, ±1, or ±2, thereby producing partial results, which are corrected by the adders 14 into positive numbers that are thereafter outputted as partial products 15 (P00–P06, P10–P16, P20–P26, P30–P36).

The partial products 15 (P00–P06, P10–P16, P20–P26, P30–P36) which have thus been corrected into positive numbers are shifted two bits corresponding to the degree of 2 based on the secondary Booth algorithm, and inputted to the arrangement shown in FIG. 3.

Since those bits to which "1" has been added by the conversion from partial products into positive numbers are P36, P35, P26, P25, P16, P15, P06, P05, as counted from the high-order bit, the corrective bit 20 of "1" is added to the least significant bit of these bits, i.e., the bit P05, and their sum is determined.

For correcting for the conversion from partial products into positive numbers, it has heretofore been customary to add "1" to all bits to which "1" has not been added by the conversion into positive numbers, and thereafter to add "1" to the least significant bit of the sum for removal to a carry 24. According to the present invention, however, only those bits to which "1" has been added by the conversion into positive numbers are to be corrected, and "1" is added to the least significant bit of those bits, and the "1" added to each of the bits is removed to the carry 24.

In the multiplier according to the present invention, the corrective bit 20 of "1" is added to the partial product P05 by the adder 22 to correct for the conversion from the partial products into positive numbers, and thereafter the partial products 15 which have been converted into positive numbers are added by the adders 21. If the carry 24 is generated, then it is ignored, and nothing is regarded as being added to the partial products. Now, the multiplication result 23 indicative of the product of the multiplier 11 and the multiplicand 10 is outputted from the multiplier. The multiplier according to the present invention, therefore, has a small circuit scale, a low power requirement, and a high calculation speed.

If the partial products are negative before they are converted, i.e., if the multiplicand 10 is multiplied by −1 or −2, then "1" is added as P0 negative, P1 negative, P2 negative, P3 negative to the respective least significant bits P00, P10, P20, P30 of the partial products which have been converted into positive numbers.

The present invention has been described with respect to a multiplier which utilizes the secondary Booth algorithm. However, the principles of the present invention are also applicable to multipliers having different degrees, i.e., first- and third-order multipliers, and those multipliers for a multiplier and a multiplicand which have different numbers of figures.

While a preferred embodiment of the invention as been described in specific terms, this description is for illustrative purposes only, and it is to be understood that changes and variations may be made without departing from the spirit or scope of the following claim.

What is claimed is:

1. A multiplier, comprising:

coefficient generating means for generating a plurality of coefficients each corresponding to radical numbers of 2 including $2^0$ and $2^1$ from predetermined bits of a multiplier based on the Booth algorithm;

partial product generating means for calculating a plurality of partial products indicative of products of said coefficients and a multiplicand of M bits (M is a positive integer);

first adding means for adding "1" to each of Mth and (M+1)th bits as counted from a least significant bit of each of said partial products;

second adding means for adding "1" to an Mth bit as counted from a least significant bit of a multiplication result; and third adding means for adding a sum from said first adding means and a sum from said second adding means depending on the radical numbers of 2.

2. The multiplier according to claim 1, further including fourth adding means for adding "1" to a bit or bits of the added result of said third adding means, said bit or bits corresponding to the least significant bit of each partial product, when said partial product generated by said partial product generating means is negative.

\* \* \* \* \*